United States Patent
Galle et al.

(10) Patent No.: US 9,341,039 B2
(45) Date of Patent: May 17, 2016

(54) DAMAGE TOLERANT CASING HANGER SEAL

(71) Applicant: Vetco Gray Inc., Houston, TX (US)

(72) Inventors: Gary L. Galle, Houston, TX (US); Rick C. Hunter, Friendswood, TX (US)

(73) Assignee: Vetco Gray Inc., Houston, TX (US)

( * ) Notice: Subject to any disclaimer, the term of this patent is extended or adjusted under 35 U.S.C. 154(b) by 13 days.

(21) Appl. No.: 14/454,012

(22) Filed: Aug. 7, 2014

(65) Prior Publication Data

US 2014/0345850 A1    Nov. 27, 2014

Related U.S. Application Data

(62) Division of application No. 13/253,702, filed on Oct. 5, 2011, now abandoned.

(51) Int. Cl.
| | | |
|---|---|---|
| E21B 33/03 | (2006.01) | |
| E21B 33/04 | (2006.01) | |
| F16J 15/20 | (2006.01) | |
| F16J 15/26 | (2006.01) | |
| F16J 15/16 | (2006.01) | |
| F16J 15/18 | (2006.01) | |

(52) U.S. Cl.
CPC ............ *E21B 33/03* (2013.01); *E21B 33/04* (2013.01); *F16J 15/166* (2013.01); *F16J 15/18* (2013.01); *F16J 15/189* (2013.01); *F16J 15/20* (2013.01); *F16J 15/26* (2013.01)

(58) Field of Classification Search
CPC ....... E21B 33/03; E21B 33/035; E21B 33/04; E21B 33/043
USPC .......... 166/368, 348; 277/322, 323, 329, 510, 277/511, 529, 530, 531
See application file for complete search history.

(56) References Cited

U.S. PATENT DOCUMENTS

| | | | |
|---|---|---|---|
| 3,467,394 A | 9/1969 | Bryant | |
| 4,281,840 A | 8/1981 | Harris | |
| 4,406,469 A | 9/1983 | Allison | |
| 4,441,721 A | 4/1984 | Harris | |
| 4,561,499 A * | 12/1985 | Berner et al. | ............. 166/341 |
| 4,697,640 A | 10/1987 | Szarka | |

(Continued)

FOREIGN PATENT DOCUMENTS

WO    WO 03/102360 A1    12/2003

OTHER PUBLICATIONS

PCT Search Report mailed Oct. 23, 2003—S.N. PCT/US 03/15697, Filed Oct. 13, 2003.

*Primary Examiner* — Matthew R Buck
(74) *Attorney, Agent, or Firm* — Bracewell LLP

(57) ABSTRACT

A seal assembly is inserted within an annulus between inner and outer coaxially disposed annular members having a common axis. The seal assembly includes a seal stack having a compliant element sandwiched between two anti-extrusion elements that contain the flow of the compliant element. The seal assembly also includes a sealing ring and a locking ring coupled to the sealing ring. The seal assembly also includes an energizing ring configured to be moved axially in a first direction by a ring tool to apply an axial force to the locking ring, which in turn acts on the sealing ring to radially deform the sealing ring into sealing engagement with the annular members. Continued axial movement of the locking ring in the first direction radially deforms the locking ring into locking engagement with the annular members.

20 Claims, 6 Drawing Sheets

(56) References Cited

U.S. PATENT DOCUMENTS

| | | | |
|---|---|---|---|
| 4,751,965 A * | 6/1988 | Cassity | 166/182 |
| 4,921,045 A | 5/1990 | Richardson | |
| 5,224,715 A * | 7/1993 | Downes | E21B 33/04 277/322 |
| 6,367,558 B1 * | 4/2002 | Borak, Jr. | 166/387 |
| 8,668,021 B2 | 3/2014 | Duong | |
| 8,720,586 B2 * | 5/2014 | Duong | 166/368 |
| 2005/0178559 A1 | 8/2005 | Jacob | |
| 2008/0136118 A1 | 6/2008 | Ando et al. | |
| 2008/0230236 A1 | 9/2008 | Wright et al. | |
| 2010/0126736 A1 * | 5/2010 | Ellis et al. | 166/387 |

* cited by examiner

Fig. 4A
Fig. 4B
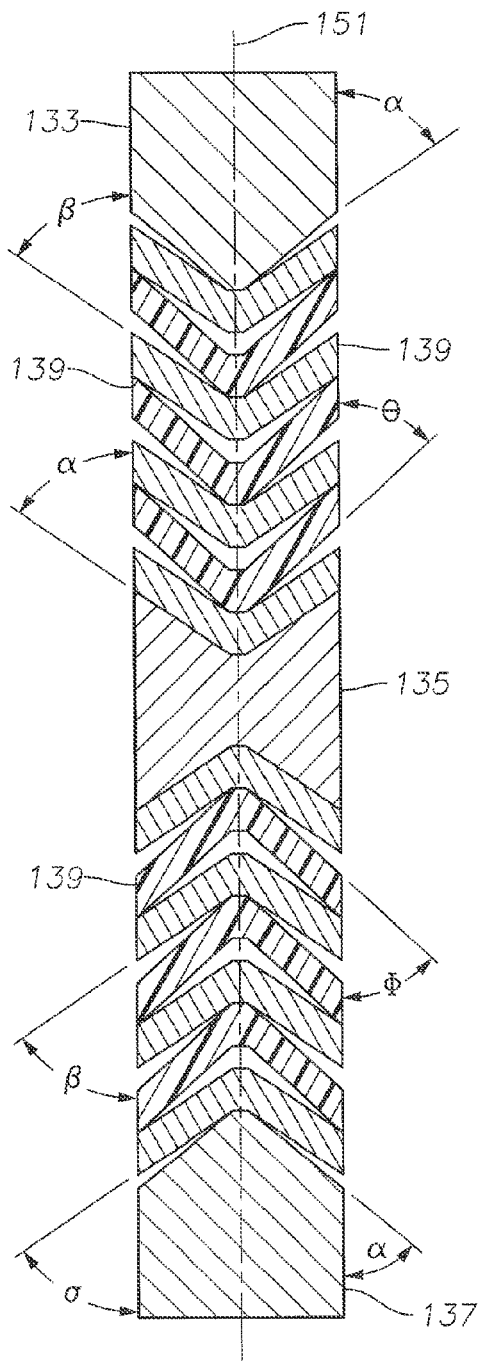
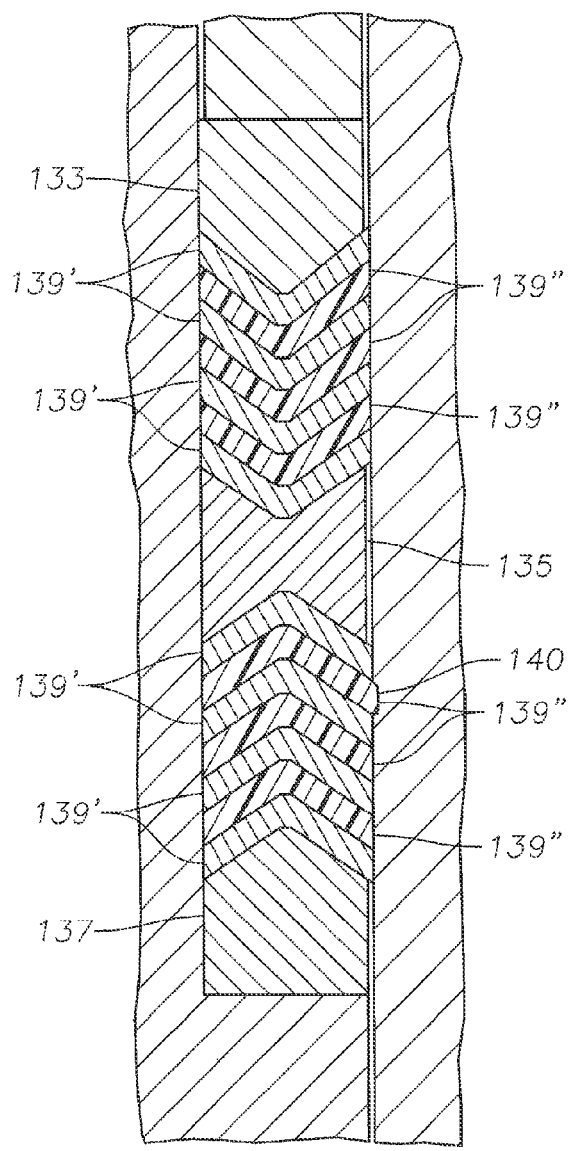

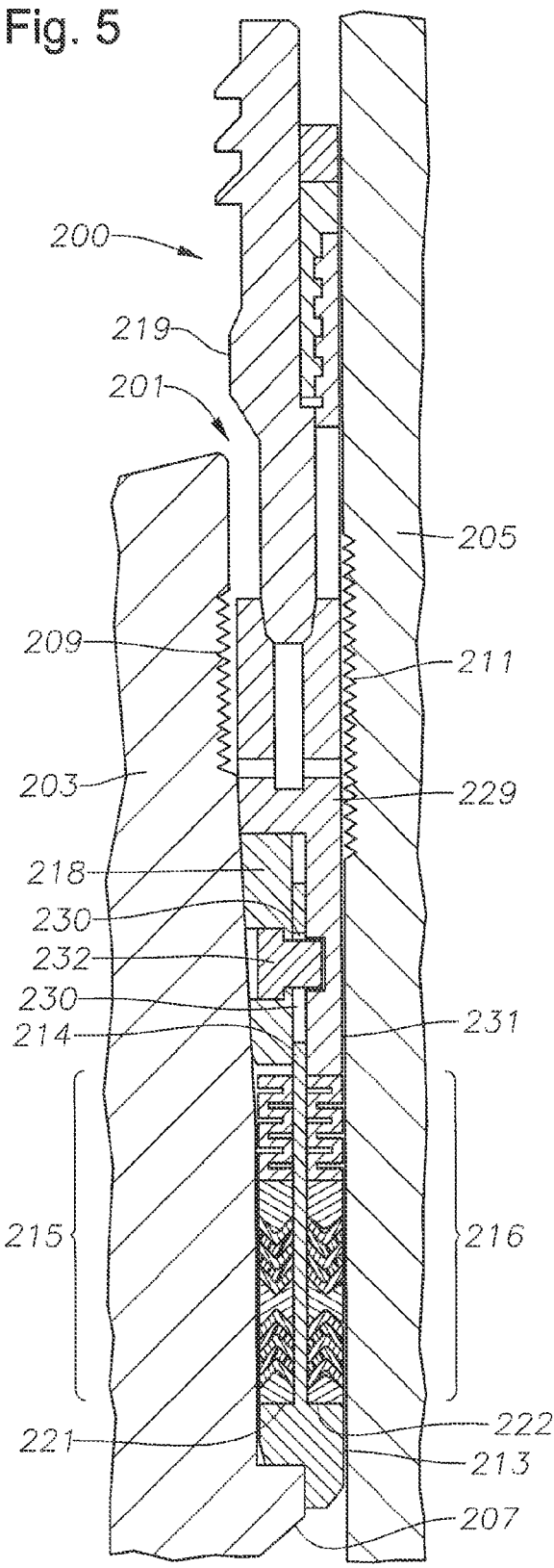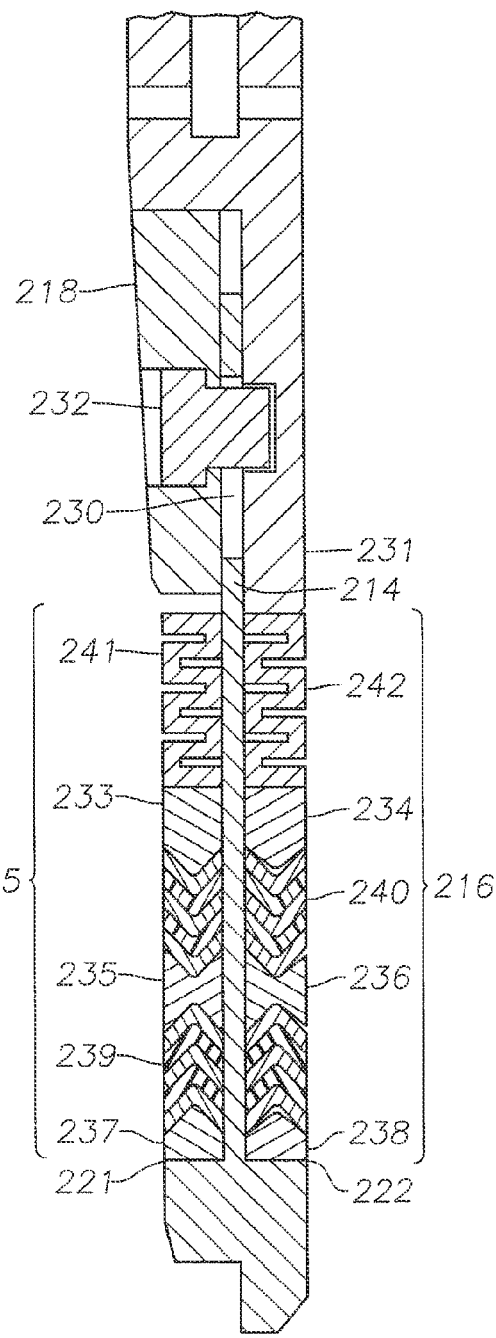

DAMAGE TOLERANT CASING HANGER SEAL

This application is a divisional of Ser. No. 13/253,702, filed Oct. 5, 2011.

BACKGROUND OF THE INVENTION

1. Field of the Invention

The present invention relates in general to wellhead seals and, in particular, to a damage tolerant casing hanger seal.

2. Brief Description of Related Art

During creation of a wellhead, drilling operations often cause damage to casing elements of the well inserted into the wellbore prior to the switch from drilling to production. In particular, casing hangers and high pressure wellhead housing can be damaged with scratches and gouges that range from minor scratches, such as a few thousandths deep, to major scratches, as much 0.1" deep. In order to seal the wellbore, seals must be constructed of compliant material that can extrude and fill the scratches and gouges. Currently, seals consisting of elastomer seal elements are used to seal the wellbore annulus between the casing elements.

Unfortunately, elastomer seal elements do not meet the current needs of well drilling and production. For example, many seals are used in conditions where the seal is subjected to extreme cold, extreme heat, and/or cycles between the two extremes. In these situations, the elastomer seals fatigue and fail prior to the end of the seal's desired field life. Current industry standards allow for a ninety day seal field life. However, industry desires a seal that can last the expected life of the well, approximately twenty years. In addition, the life cycle of the well may include start up and shut down of the well, pressure testing of well elements, and the like. These life cycle activities increase the number of extreme stress and temperature cycles to which elastomer seals are exposed. The life cycle activities cause elastomer seals to fatigue and fail well before the twenty year desired field life requirement of wellhead seal systems. Therefore, there is a need for wellhead seals that can withstand extreme temperatures, extreme temperature cycling, and varying life cycle operations of the well up to an expected life cycle of twenty years.

In addition, elastomer seal elements may experience explosive decompression. Explosive decompression occurs when high pressures surrounding an eleastomer sealing element force the elastomer seal to absorb gases from the surrounding environment. When pressures surrounding the eastomer seal element drop, the gases absorbed into the elastomer seal element at higher pressures rapidly escape the elastomer seal element. The rapid escape of gases causes tearing and destruction of the elastomer seal element. Therefore, there is a need for wellhead seals that are not subject to failure by explosive decompression during high pressure loading and unloading cycles.

Many wellhead seals use elements that seal the annulus between wellhead members by means of an interference seal. Interference seals use sealing members with a slightly larger width than the annular space to be sealed. Interference seals force the sealing members into the sealing area to prevent passage of fluid or other materials. Because these interference seals are larger than the annular space to be sealed, use of an interference seal often causes damage to the annular space to be sealed and the interference seal itself. This hinders drilling and operation of the well and leads to early failure of the seal. Therefore, there is a need for wellhead seals that will not damage the wellhead casing elements during insertion and energizing.

Many wellhead seal assemblies used to seal an annulus between wellhead casing elements are not retrievable. Once put in place and energized, the seal cannot be removed. It is in the wellhead until the seal fails. This can hinder drilling and operation of the well where the seal may interfere with running tools and the like. In addition, during emergency situations, standard seals cannot be retrieved; thus, once a seal is used in an emergency situation, it must remain in the wellbore. This prevents use of subsequent better seals or the passage of other equipment or tools through the space. Therefore, there is a need for wellhead seals that are retrievable.

SUMMARY OF THE INVENTION

These and other problems are generally solved or circumvented, and technical advantages are generally achieved, by preferred embodiments of the present invention that provide a seal assembly, and a method for using the same.

In accordance with an embodiment of the present invention, a seal assembly for sealing within an annulus between inner and outer coaxially disposed annular members having a common axis comprises a first anti-extrusion sealing ring having a chevron shaped geometry, and a second anti-extrusion sealing ring having a chevron shaped geometry. The second anti-extrusion sealing ring is coaxial with and axially below the first anti-extrusion sealing ring. The seal assembly also comprises a first compliant sealing ring having a chevron shaped geometry. The first compliant sealing ring is coaxial with and interposed between the first anti-extrusion sealing ring and the second anti-extrusion sealing ring. At least one of the first and second anti-extrusion sealing rings is configured to radially engage at least one of the inner and outer coaxially disposed annular members when subjected to an axial force. The first compliant sealing ring is configured to radially engage at least one of the inner and outer coaxially disposed annular members when subjected to an axial force.

In accordance with another embodiment of the present invention, a seal assembly for sealing within an annulus between inner and outer coaxially disposed annular members having a common axis comprises a seal stack, and an upper activation ring. The upper activation ring is coaxial with and axially above the seal stack. The upper activation ring has a lower mating surface forming an angle to the axis different from the adjacent surface of the seal stack. The seal assembly also comprises a lower activation ring coaxial with and axially below the seal stack. The lower activation ring has an upper mating surface forming an angle to the axis different from the adjacent surface of the seal stack. Mating surfaces between elements of the seal stack are at equivalent angles to the axis. This the elements to contact the along the length of the mating surfaces. Under axial load contact between the upper and lower activation ring mating surfaces with adjacent seal stack mating surfaces causes radial expansion of the seal stack.

In accordance with yet another embodiment of the present invention, a seal assembly for sealing within an annulus between inner and outer coaxially disposed annular members having a common axis comprises a first seal stack having an inner diameter. The first seal stack has compliant sealing elements that, when energized, seal to a damaged surface of the outer annular member. The seal assembly also comprises a second seal stack coaxial with the first seal stack. The second seal stack has an outer diameter smaller than the inner diameter of the first seal stack. In addition, the second seal stack has compliant sealing elements that, when energized, seal to a damaged surface of the inner annular member.

In yet another embodiment of the present invention, a method for sealing within an annulus between inner and outer coaxially disposed annular members having a common axis comprises providing a sealing ring, and coupling a locking ring to the sealing ring. The method continues by axially moving an energizing ring in a first direction with a ring tool to apply an axial force to the locking ring, which in turn acts on the sealing ring to radially deform the sealing ring into sealing engagement with the annular members. The method concludes by continuing axial movement of the locking ring in the first direction to radially deform the locking ring into locking engagement with the annular members.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 4A is a detail view of exemplary sealing rings of FIG. 1.

FIG. 4B is a detail view of energized exemplary sealing rings of FIG. 1.

FIG. 5 is a sectional view of a sealing assembly in accordance with an embodiment of the present invention.

FIG. 6 is a detail view of the sealing assembly of FIG. 5.

DETAILED DESCRIPTION OF THE PREFERRED EMBODIMENT

The present invention will now be described more fully hereinafter with reference to the accompanying drawings that illustrate embodiments of the invention. This invention may be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning drilling unit operation, materials, and the like have been omitted inasmuch as such details are not considered necessary to obtain a complete understanding of the present invention, and are considered to be within the skills of persons skilled in the relevant art.

Figure 1:
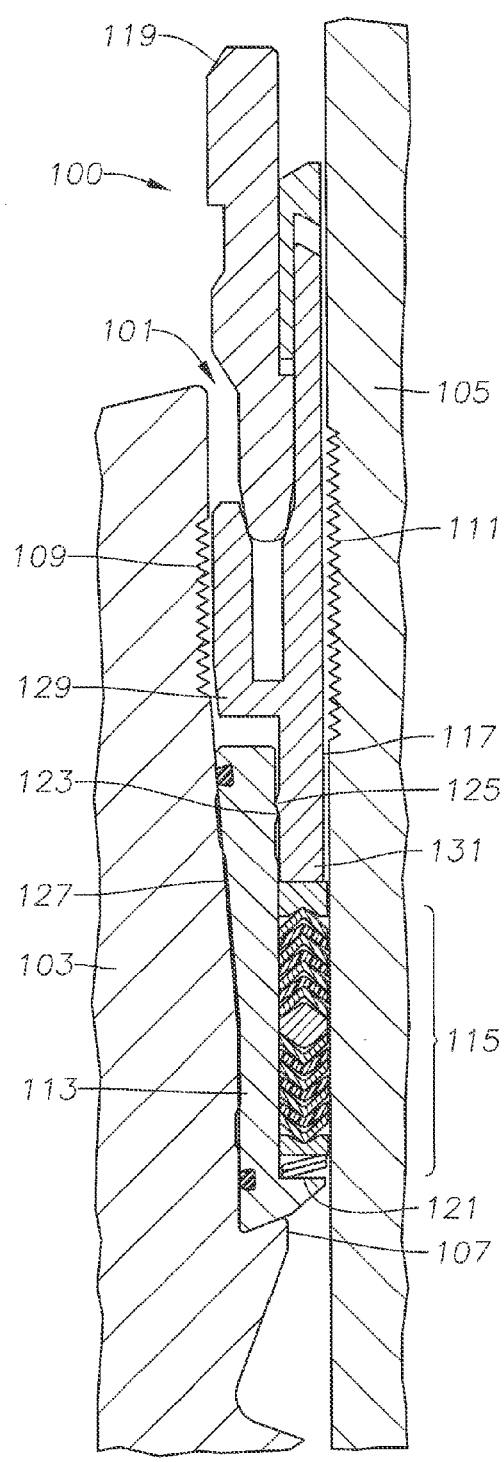
FIG. 1 is a sectional view of a sealing assembly in accordance with an embodiment of the present invention.

Referring to FIG. 1, an un-energized casing hanger seal 100 is shown positioned within an annulus 101 between a casing hanger 103 and a high pressure wellhead housing 105 having a common axis. Casing hanger 103 is that portion of a wellhead assembly that provides support for subsequent casing strings lowered into the wellbore. Casing hanger 103 has a shoulder 107 at a lower end of casing hanger 103, and wickers 109 proximate to an upper end of casing hanger 103. Similarly, wellhead housing 105 has wickers 111 proximate to wickers 109 across annulus 101 such that, absent casing hanger seal 100, wickers 109 and wickers 111 approximately face each other across annulus 101.

Casing hanger seal 100 comprises a seal retainer ring 113, sealing ring assembly 115, locking ring 117, and energizing ring 119. Sealing ring assembly 115 mounts to seal retainer ring 113 on a shoulder 121 of seal retainer ring 113. Locking ring 117 movably couples to seal retainer ring 113 such that locking ring 117 applies an axial force to sealing ring assembly 115 when casing hanger seal 100 is energized (see FIG. 3). In the illustrated embodiment, seal retainer ring 113 defines an annular protrusion 123, and locking ring 117 defines a corresponding protrusion 125 such that when energized (shown in FIG. 3) protrusion 125 will move past protrusion 123 in an interference fit securing locking ring 117 to seal retainer ring 113 in the energized state. This interference fit may occur by force of the weight of locking ring 117 or by exertion of an axial force on locking ring 117, such as by energizing ring 119. A person skilled in the art will understand that locking ring 117 and seal retainer ring 113 may be coupled by means of shear bolts or the like.

Locking ring 117 comprises an annular member having an approximately U-shaped cross section 129 with locking ring legs 143, 145 and a lower leg 131. Lower leg 131 extends past an upper end of seal retainer ring 113 and contacts a top of sealing ring assembly 115. Energizing ring 119 comprises a ring having an axially lower end slightly larger than the U-shaped slot defined by locking ring 117. As described in more detail below, a running tool will apply an axial force to energizing ring 119, forcing energizing ring 119 axially into locking ring 117, providing an interference fit that will press locking ring legs 143, 145 of locking ring 117 into adjacent wickers 109 and 111. A person skilled in the art will understand that the energizing ring 119 may be energized by a running tool or the like.

Figure 2:
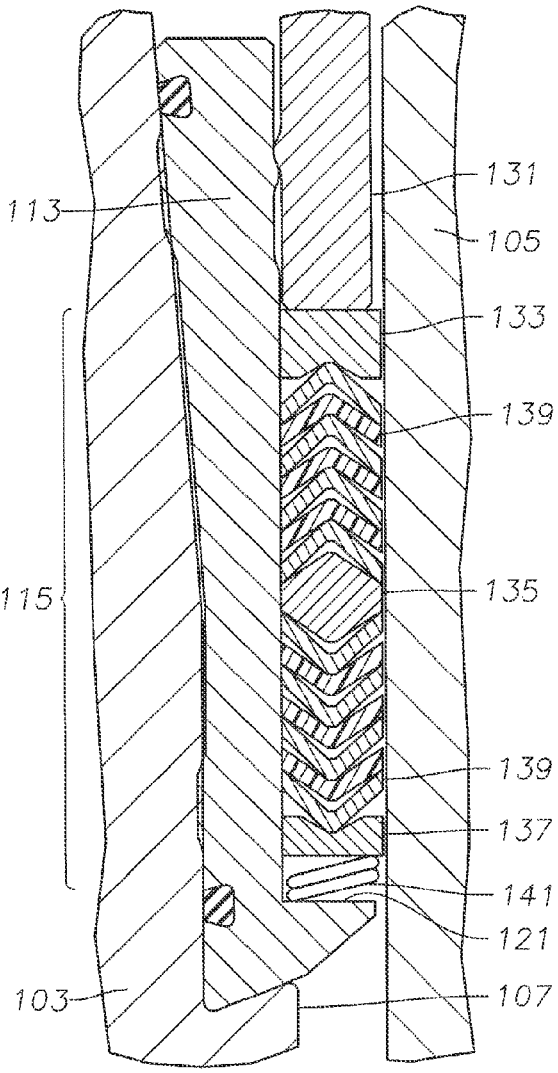
FIG. 2 is a detail view of the sealing assembly of FIG. 1.

Referring now to FIG. 2, there is shown casing hanger 103, shoulder 107 of casing hanger 103, seal retainer ring 113, lower leg 131 of locking ring 119, and sealing ring assembly 115 of FIG. 1. As illustrated in FIG. 2, sealing ring assembly 115 comprises an upper base ring 133, a center ring 135, and a lower base ring 137. Preferably, upper base ring 133, center ring 135, and lower base ring 137 are formed of a high strength steel or the like. In addition, sealing ring assembly 115 comprises a plurality of sealing rings 139, and a spring element 141. Spring element 141 mounts to seal retainer ring 113 at shoulder 121 of seal retainer ring 113. Preferably, spring element 141 is preloaded such that spring element 141 exerts an axial force on sealing ring assembly 115 after casing hanger seal 100 is energized. Preferably, spring element 141 is formed of a high strength low yield material. In the illustrated embodiment, spring element 141 comprises Bellville washers, although a person of skill in the art will understand that other spring elements may be used.

Lower base ring 137 mounts to seal retainer ring 113 proximate to, and axially above spring element 141 such that an axial force preloaded into spring element 141 during manufacture of casing hanger seal 100 will transfer through lower base ring 137. Upper base ring 133 mounts to seal retainer ring 113 axially above sealing rings 139 and proximate to lower leg 131 of locking ring 117. Upper base ring 133 provides an upper base for the transfer of axial energy from locking ring 117 to sealing rings 139.

Sealing rings 139 comprise a series of axially stacked chevron rings creating a seal stack. In cross-section, each sealing ring 139 has a V-shape and is preferably of constant thickness. Before being set, the radial width of each sealing ring 139 from its inner diameter to its outer diameter is less than the radial width of the seal pocket. Beginning at lower base ring 137, sealing rings 139 are stacked such that an apex of a sealing ring 139 is adjacent to or contacts lower base ring 137. Sealing rings 139 are then stacked axially above lower base ring 137 in alternating layers of materials such that the apex of the subsequent ring inserts into a concave portion of the prior ring. In the illustrated embodiment, the sealing ring 139 adjacent to lower base ring 137 comprises a metal such as carbon steel or the like. The next sealing ring 139 comprises a thermoplastic material, such as Teflon or the like. Following the thermoplastic sealing ring 139 another metal sealing ring 139 is stacked axially over the prior thermoplastic sealing ring 139. This continues until the number of sealing rings 139 needed for the particular application is reached. In the illustrated embodiment, seven sealing rings 139 are used between lower base ring 137 and center ring 135. A person skilled in the art will understand that any desired number of sealing rings 139 may be used. For example, embodiments may include use of three, five, or nine sealing rings 139.

Center ring 135 mounts to seal retainer ring 113 axially interposed between adjacent but oppositely facing sealing rings 139. A lower annular surface of center ring 135 approximately conforms to a concave portion of the sealing ring 139 axially below center ring 135. Similarly, an upper annular surface of center ring 135 approximately conforms to a concave portion of the sealing ring 139 axially above center ring 135. Sealing rings 139 are then stacked axially above center ring 135 in alternating layers of materials such that an apex of the prior ring inserts into a concave portion of the subsequent ring. In the illustrated embodiment, the sealing ring 139 adjacent to center ring 135 comprises a metal such as carbon steel or the like. The next sealing ring 139 comprises a thermoplastic material, such as Teflon or the like. Following the thermoplastic sealing ring 139 another metal sealing ring 139 is stacked axially over the prior thermoplastic sealing ring 139. This continues until the number of sealing rings 139 needed for the particular application is reached. In the illustrated embodiment, seven sealing rings 139 are used between center ring 135 and upper base ring 133. A person skilled in the art will understand that any desired number of sealing rings 139 may be used. For example, embodiments may include use of three, five, or nine sealing rings 139. Similarly, a different number of sealing rings 139 may be used above and below center ring 135. For example, embodiments may include use of three sealing rings 139 above center ring 135 and five sealing rings 139 below center ring 135. Conversely, embodiments may include use of five sealing rings 139 above center ring 135 and three sealing rings 139 below center ring 135.

A lower annular surface of upper base ring 133 approximately conforms and abuts the apex of the sealing ring 139 adjacent to upper base ring 133. In this manner, sealing rings 139 are bound by upper base ring 133, center ring 135, and lower base ring 137. When energized, described in more detail below, axial forces exerted on upper and lower base rings 133, 137 will cause sealing rings 139 to flair radially inward and outward coming into tight sealing contact with seal retainer ring 113 and high pressure housing 105. The outer diameter edge seals against high pressure housing 105. The inner diameter edge seals against retainer ring 113.

In this manner two separate stacks of sealing rings 139 are used, one in which the apex of sealing rings 139 is axially up, and one in which the apex of sealing rings 139 is axially down. This allows casing hanger seal 100 to effectively seal bi-directionally. Annulus 101 will be sealed regardless of whether pressure is applied above or below casing hanger seal 100.

Sealing ring 139 materials are selected based on the varying properties of the thermoplastic and metal rings. Preferably, both the thermoplastic rings and the metal rings must flare radially when energized. In addition, the thermoplastic rings should not extrude too quickly. Ideally, the metal sealing rings will flare radially prior to extrusion of thermoplastic rings, thereby containing the flow of the thermoplastic rings. Following flare of metal sealing rings, thermoplastic sealing rings will extrude into any abrasions or scratches in high pressure housing 105. A preferred embodiment uses 15% carbon filled PTFE for the thermoplastic sealing rings, and carbon steel metal sealing rings having a yield strength of 40 ksi or less. Alternative embodiments of thermoplastic sealing rings may use PEEK or include varying amounts of carbon fiber, nanotubes, graphite particles and the like. In still other embodiments, thermoplastic sealing rings may be replaced with soft metal rings comprised of brass, tin, brass tin alloys, and the like. These materials provide an effective working temperature range of casing hanger seal 100 from −20 degrees Fahrenheit to 350 degrees Fahrenheit. Appropriate materials of sealing rings 139 gives casing hanger seal 100 an effective life of 20 years through any manner of pressure or temperature cycling caused by operation of the well.

Figure 3:
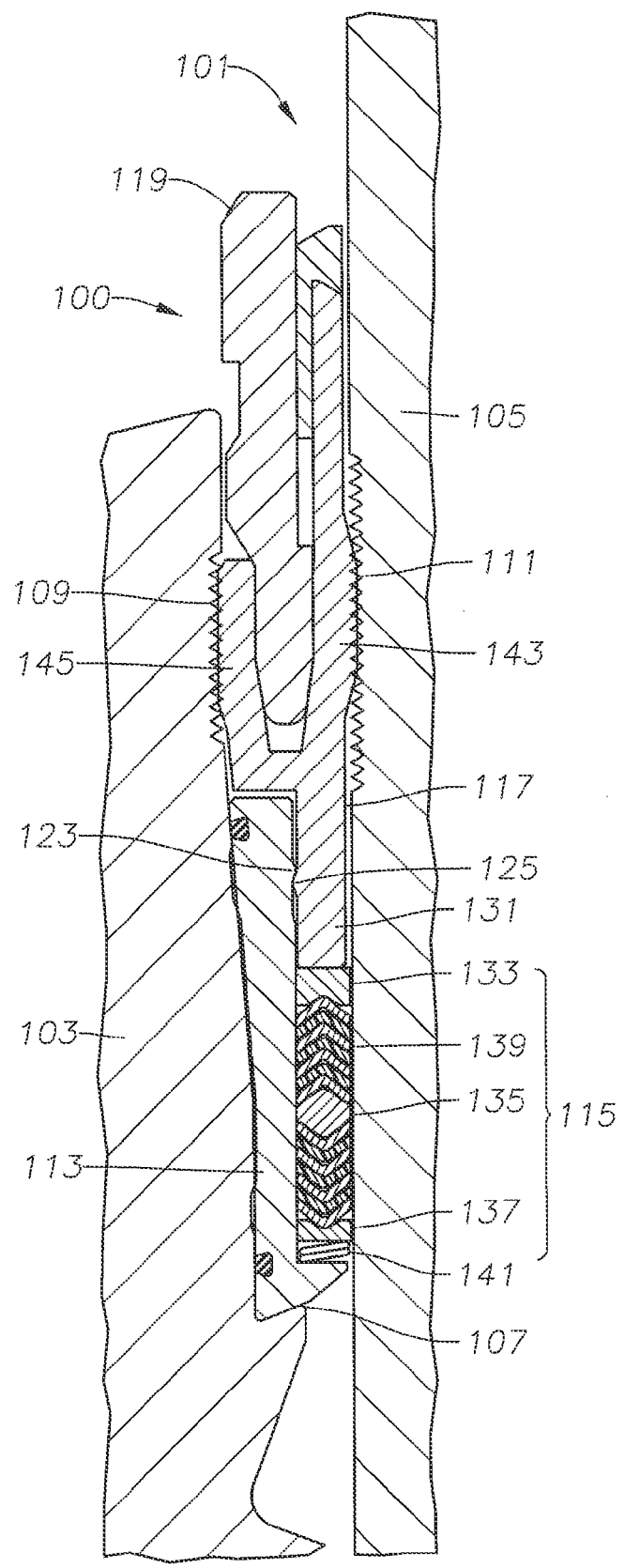
FIG. 3 is a sectional view of an energized sealing assembly of FIG. 1.

Referring now to FIG. 3, energizing ring 119 has energized casing hanger seal 100. Here, a casing hanger running tool (not shown) has forced the energizing ring 119 into the slot defined by locking ring 117. Initially, an axial force applied to energizing ring 119 by the casing hanger running tool forces energizing ring 119 against locking ring 117. In response, protrusion 125 of locking ring 117 pushes past protrusion 123 of seal retainer ring 113. The axial force also forces lower leg 131 of locking ring 117 to against upper base ring 133 compressing sealing ring assembly 115.

In the illustrated embodiment, the compression of sealing ring assembly 115 causes sealing rings 139 to flare radially. As shown in FIG. 4A, this occurs due to the differing angle of each sealing ring arm 139 relative to the adjacent sealing ring arm 139. In FIG. 4A, surfaces of upper base ring 133, center ring 135, and lower base ring 137 adjacent to a sealing ring 139 all form angles of a with a vertical axis 151. Adjacent surfaces of the arms of sealing rings 139 instead form varying angles of $\beta$, $\theta$, $\phi$, and $\sigma$ with vertical axis 151. When sealing assembly 115 is compressed, the varying angles flare the arms of sealing rings 139 outward radially rather than toward vertical axis 151. The angle of each sealing ring 139 is determined through use of Finite Element Analysis in order to generate the desired contact with the sealed members based on the particular geometry of sealed members and the materials used in the individual sealing rings. In some instances a may be greater than $\beta$, $\theta$, $\phi$, and $\sigma$, and in others a may be both greater than or less than the angles of the $\beta$, $\theta$, $\phi$, and $\sigma$ group. In alternative embodiments, each arm of each sealing ring 139 does not have a different angle from the arm of the adjacent sealing ring 139. In these instances, upper base ring 133, center ring 135, and lower base ring 137 have a differential angle at the point of contact with the adjacent sealing ring 139 as described in more detail below with respect to FIG. 8. Under compression, it is the differential angle of upper base ring, center ring, and lower base ring 133, 135, 139 that causes flaring of sealing rings 139. A person skilled in the art will understand that the angle of each sealing ring 139 may be selected so that the sealing effect of the individual sealing ring 139 increases as fluid or gas pressure within annulus 101 increases.

As described above, seal assembly 115 includes a seal stack of sealing rings 139. The seal stack has an anti-extrusion sealing ring 139', preferably comprised of a metal, axially above and below a compliant sealing ring 139", preferably comprised of a thermoplastic material. As shown in FIG. 4B, when energized, sealing rings 139 flare radially. Flared anti-extrusion sealing rings 139' engage high pressure housing 105 and seal retainer ring 113, creating a trapped volume between the upper anti-extrusion sealing ring 139' and the lower anti-extrusion sealing ring 139'. The trapped volume constrains any deformation of compliant sealing ring 139". The axial pressure on sealing ring assembly 115 deforms compliant sealing ring 139", causing compliant sealing ring 139" to flow into sealing engagement with high pressure housing 105 and seal retainer ring 113. In this manner, compliant sealing rings 139" will fill any damaged areas 140 of high pressure housing 105 in the area to be sealed by casing hanger seal 100. In some embodiments, at least one of the anti-extrusion sealing rings 139' above and below compliant sealing ring 139" will seal to high pressure housing 105 and seal retainer ring 113. In these embodiments, each sealing ring 139 may be selected for a specific purpose. For example, a first anti-extrusion sealing ring 139' may seal to high pressure housing 105 and seal retainer ring 113, a compliant sealing ring 139" may fill damaged areas 140 of high pressure housing 105, and a second anti-extrusion sealing ring 139' may not seal to high pressure housing 105 or seal retainer ring 113 while still constraining deformation of complaint sealing ring 139".

Continued application of an axial force to energizing ring 119 following compression and flaring of sealing ring assembly 115 forces energizing ring 119 into the slot defined by locking ring 117. As shown in FIG. 3, this forces locking ring legs 143, 145 radially into wickers 109, 111 of casing hanger 103 and high pressure housing 105. Locking ring legs 143, 145 then deform into wickers 109, 111, limiting axial movement of locking ring 117. The limitation of axial movement of locking ring 117 maintains compression of sealing ring assembly 115, helping to maintain the flare of sealing rings 139 and an effective seal of annulus 101.

In the illustrated embodiment, spring element 141 is preloaded such that spring element 141 exerts an axial force on sealing ring assembly 115. During operational use of casing hanger seal 100, casing hanger seal 100 will experience thermal expansion and contraction. The thermal expansion and contraction of casing hanger seal 100 will cause axial slippage of locking ring 117 lessening the axial force on seal assembly 115. Preloaded spring element 141 will exert an axial force on seal assembly 115 to maintain the flare of sealing rings 139 during events of axial slippage of locking ring 117. In this manner, casing hanger seal 100 maintains an effective seal of annulus 101.

Axial pressure from energizing ring 119 also forces seal retainer ring 113 into an interference fit with casing hanger 103. When energized, seal retainer ring 113 engages casing hanger 103 in an interference fit along inner diameter surface 127. In some embodiments, the metal to metal seal created between seal retainer ring 113 and casing hanger 103 is enhanced by coating inner diameter surface 127 with a soft metal such as silver that will deform into any abrasions or scratches in the surface of casing hanger 103. In other embodiments, inner diameter surface 127 is coated with a dispersion coating having an extremely low coefficient of friction, approaching 0.007, allowing for a tighter interference fit during placement and energizing of casing hanger seal 100.

In instances where casing hanger seal 100 must be removed, a running tool secures to energizing ring 119 and applies an upward axial force. This upward axial force withdraws energizing ring 119 from the slot defined by locking ring 117. In response, locking ring legs 143, 145 withdraw from their deformed positions on wickers 109, 111, thus unlocking locking ring 117. Once locking ring 117 is removed from its locked position, an axial force no longer maintains compression of seal assembly 115 releasing the seal maintained by sealing rings 139 unsealing annulus 101. A running tool may then retrieve casing hanger seal 100 from the annulus 101 without causing damage to casing hanger 103 or high pressure housing 105.

Referring now to FIG. 5, an un-energized casing hanger seal 200 is shown positioned within an annulus 201 between a casing hanger 203 and a high pressure wellhead housing 205. Casing hanger 203 is that portion of a wellhead assembly that provides support for subsequent casing strings lowered into the wellbore. Casing hanger 203 has a shoulder 207 at a lower end of casing hanger 203, and wickers 209 proximate to an upper end of casing hanger 203. Similarly, wellhead housing 205 has wickers 211 proximate to wickers 209 across annulus 201 such that, absent casing hanger seal 200, wickers 209 and wickers 211 approximately face each other across annulus 201.

Casing hanger seal 200 comprises a seal retainer ring 213, inner sealing ring assembly 215, outer sealing ring assembly 216, locking ring 217, coupling ring 218, and energizing ring 219. Seal retainer ring 213 defines an inner shoulder 221 and an outer shoulder 222 separated by a cylindrical member 214. Inner sealing ring assembly 215 mounts to seal retainer ring 213 on a shoulder 221 of seal retainer ring 213. Outer sealing ring assembly 216 mounts to seal retainer ring 213 on shoulder 222 of seal retainer ring 213. Locking ring 217 movably couples to seal retainer ring 213 such that locking ring 217 applies an axial force to inner and outer sealing ring assemblies 215, 216 when casing hanger seal 200 is energized (see FIG. 7).

Locking ring 217 comprises an annular member having an approximately U-shaped cross section 229 with locking ring legs 243, 245 and a lower leg 231 extending past an upper end of cylindrical member 214 of seal retainer ring 213 and contacting a top of outer sealing ring assembly 216. Coupling ring 218 comprises a ring having an diameter less than the diameter of lower leg 231. In the illustrated embodiment, an outer diameter surface of coupling ring 218 abuts an inner diameter of cylindrical member 214 proximate to a plurality of bolt slots 230 and axially above inner seal assembly 215. Coupling ring 218 couples to lower leg 231 of locking ring 217 by a plurality of bolts 232. Bolt slots 230 comprise a plurality of slots in cylindrical member 214 proximate to an upper end of cylindrical member 214. Bolt slots 230 are of a size and shape such that locking ring 217 and coupling ring 218 may move axially with respect to cylindrical member 214, thereby compressing inner and outer seal assemblies 215, 216.

Energizing ring 219 comprises a ring having an axially lower end slightly larger than the slot defined by locking ring 217. As described in more detail below, a running tool will apply an axial force to energizing ring 219 forcing energizing ring 219 axially into locking ring 217 providing an interference fit that will press locking ring legs 243, 245 of locking ring 217 into adjacent wickers 209 and 211. A person skilled in the art will understand that the energizing ring 219 may be energized by a running tool or the like.

Referring now to FIG. 6, there is shown seal retainer ring 213, lower leg 231 of locking ring 217, coupling ring 218, bolt slot 230, bolt 232 and inner and outer sealing ring assemblies 215, 216 of FIG. 5. As illustrated in FIG. 6, inner sealing ring assembly 215 comprises an upper base ring 233, a center ring 235, and a lower base ring 237. In addition, inner sealing ring assembly 215 comprises a plurality of sealing rings 239, and a spring element 241. Similarly, outer sealing ring assembly 216 comprises an upper base ring 234, a center ring 236, a lower base ring 238, a plurality of sealing rings 240, and a spring element 242. Preferably, inner and outer upper base rings 233, 234, inner and outer center rings 235, 236, and inner and outer lower base rings 237, 238 are formed of a high strength steel or the like. In addition, inner and outer spring elements 241, 242 are preferably formed of a high strength material having low yield.

Inner and outer lower base rings 237, 238 mount to seal retainer ring 213 at shoulders 221, 222. Inner and outer upper base rings 233, 234 mount to seal retainer ring 113 axially above inner and outer sealing rings 239, 240 proximate to and axially below inner and outer spring elements 241, 242 such that an axial force preloaded into inner and outer spring elements 241, 242 during manufacture of casing hanger seal 200 will transfer through inner and outer upper base rings 233, 234. Inner and outer spring elements 241, 242 are proximate to lower leg 231 of locking ring 217. In the illustrated embodiment, spring elements 241, 242 comprise axial spring rings, although a person of skill in the art will understand that other spring elements may be used. Inner and outer upper base rings 233, 234 provide an upper base for the transfer of axial energy from locking ring 217 and inner and outer spring elements 241, 242 to inner and outer sealing rings 239, 240.

Inner and outer sealing rings 239, 240 comprise a series of axially stacked chevron rings. In cross-section, each inner and outer sealing ring 239, 240 has a v-shape and is preferably of constant thickness. Before being set, the radial width of each inner and outer sealing ring 239, 240 from its inner diameter to its outer diameter is less than the radial width of the seal pocket. Beginning at inner and outer lower base rings 237, 238, inner and outer sealing rings 239, 240 are stacked such that a concave portion of the inner and outer sealing ring 239, 240 is adjacent to or contacts inner and outer lower base ring 237, 238. Inner and outer sealing rings 239, 240 are then stacked axially above inner and outer lower base rings 237, 238 in alternating layers of materials such that an apex of the prior inner and outer sealing ring 239, 240 inserts into a concave portion of the subsequent inner and outer sealing ring 239, 240.

In the illustrated embodiment, the inner and outer sealing ring 239, 240 adjacent to inner and outer lower base ring 237, 238 comprises a metal such as carbon steel or the like. The next inner and outer sealing ring 239, 240 comprises a thermoplastic material, such as Teflon or the like. Following the thermoplastic inner and outer sealing ring 239, 240 another metal inner and outer sealing ring 239, 240 is stacked axially over the prior thermoplastic inner and outer sealing ring 239, 240. This continues until the number of inner and outer sealing rings 239, 240 needed for the particular application is reached. In the illustrated embodiment, five inner and outer sealing rings 239, 240 are used between inner and outer lower base ring 237, 238 and inner and outer center ring 235, 236. A person skilled in the art will understand that any desired number of inner and outer sealing rings 239, 240 may be used. For example, embodiments may include use of three, five, or nine inner and outer sealing rings 239, 240.

Inner and outer center ring 235, 236 mounts to seal retainer ring axially interposed between adjacent but oppositely facing inner and outer sealing rings 239, 240. A lower annular surface of inner and outer center ring 235, 236 approximately conforms to the apex of the inner and outer sealing ring 239, 240 axially below inner and outer center ring 235, 236. Similarly, an upper annular surface of inner and outer center ring 235, 236 approximately conforms to an apex of the inner and outer sealing ring 239, 240 axially above inner and outer center ring 235, 236. Inner and outer sealing rings 239, 240 are then stacked axially above inner and outer center ring 235, 236 in alternating layers of materials such that a concave portion of the prior inner and outer sealing ring 239, 240 receives an apex of the subsequent inner and outer sealing ring 239, 240.

In the illustrated embodiment, the inner and outer sealing ring 239, 240 adjacent to inner and outer center ring 235, 236 comprises a metal such as carbon steel or the like. The next inner and outer sealing ring 239, 240 comprises a thermoplastic material, such as Teflon or the like. Following the thermoplastic inner and outer sealing ring 239, 240 another metal inner and outer sealing ring 239, 240 is stacked axially over the prior thermoplastic inner and outer sealing ring 239, 240. This continues until the number of inner and outer sealing rings 239, 240 needed for the particular application is reached. In the illustrated embodiment, five inner and outer sealing rings 239, 240 are used between inner and outer center ring 235, 236 and inner and outer upper base ring 233, 234. A person skilled in the art will understand that any desired number of inner and outer sealing rings 239, 240 may be used and that differing numbers of inner and outer sealing rings 239, 240 may be used. For example, embodiments may include use of three, five, or nine inner and outer sealing rings 239, 240. Similarly, a different number of inner and outer sealing rings 239, 240 may be used above and below inner and outer center ring 235, 236. For example, embodiments may include use of three inner and outer sealing rings 239, 240 above inner and outer center ring 235, 236 and five inner and outer sealing rings 239, 240 below inner and outer center ring 235, 236. Conversely, embodiments may include use of five inner and outer sealing rings 239, 240 above inner and outer center ring 235, 236 and three inner and outer sealing rings 239, 240 below inner and outer center ring 235, 236. Similarly, the number of inner sealing rings 239 may differ from the number or outer sealing rings 240 used.

A lower annular surface of inner and outer upper base ring 233, 234 approximately conforms and abuts the concave portion of the inner and outer sealing ring 239, 240 adjacent to inner and outer upper base ring 233, 240. In this manner, inner and outer sealing rings 239, 240 are bound by inner and outer upper base ring 233, 234, inner and outer center ring 235, 236, and inner and outer lower base ring 237, 238. When energized, described in more detail below, axial forces exerted on inner and outer upper base rings 233, 234, and inner and outer lower base rings 237, 238 will cause inner and outer sealing rings 239, 240 to flair radially inward and outward coming into tight sealing contact with cylindrical member 214 of seal retainer ring 213, high pressure housing 205, and casing hanger 203.

In this manner two separate stacks of inner and outer sealing rings 239, 240 are used, one in which the apex of inner and outer sealing rings 239, 240 is axially up, and one in which the apex of inner and outer sealing rings 239, 240 is axially down. This allows casing hanger seal 200 to effectively seal bi-directionally. Annulus 201 will be sealed regardless of whether pressure is applied above or below casing hanger seal 200.

Inner and outer sealing ring 239, 240 materials are selected based on the varying properties of the thermoplastic and metal rings. Preferably, both the thermoplastic rings and the metal rings must flare radially when energized. In addition, the thermoplastic rings should not extrude too quickly. Ideally, the metal sealing rings will flare radially prior to extrusion of thermoplastic rings. Following flare of metal rings, thermoplastic rings extrude into any abrasions or scratches in casing hanger 203 or high pressure housing 205. A preferred embodiment uses 15% carbon filled PTFE for the thermoplastic sealing rings, and carbon steel metal sealing rings having a yield strength of 40 ksi or less. Alternative embodiments of thermoplastic sealing rings may use PEEK or include varying amounts of carbon fiber, nanotubes, graphite particles and the like. In still other embodiments, thermoplastic sealing rings may be replaced with soft metal rings comprised of brass, tin, brass tin alloys, and the like. These materials provide an effective working temperature range of casing hanger seal 200 from −20 degrees Fahrenheit to 350 degrees Fahrenheit. Appropriate selection of inner and outer sealing ring 239, 240 materials gives casing hanger seal 200 an effective life of 20 years through any manner of pressure or temperature cycling caused by operation of the well.

Figure 7:
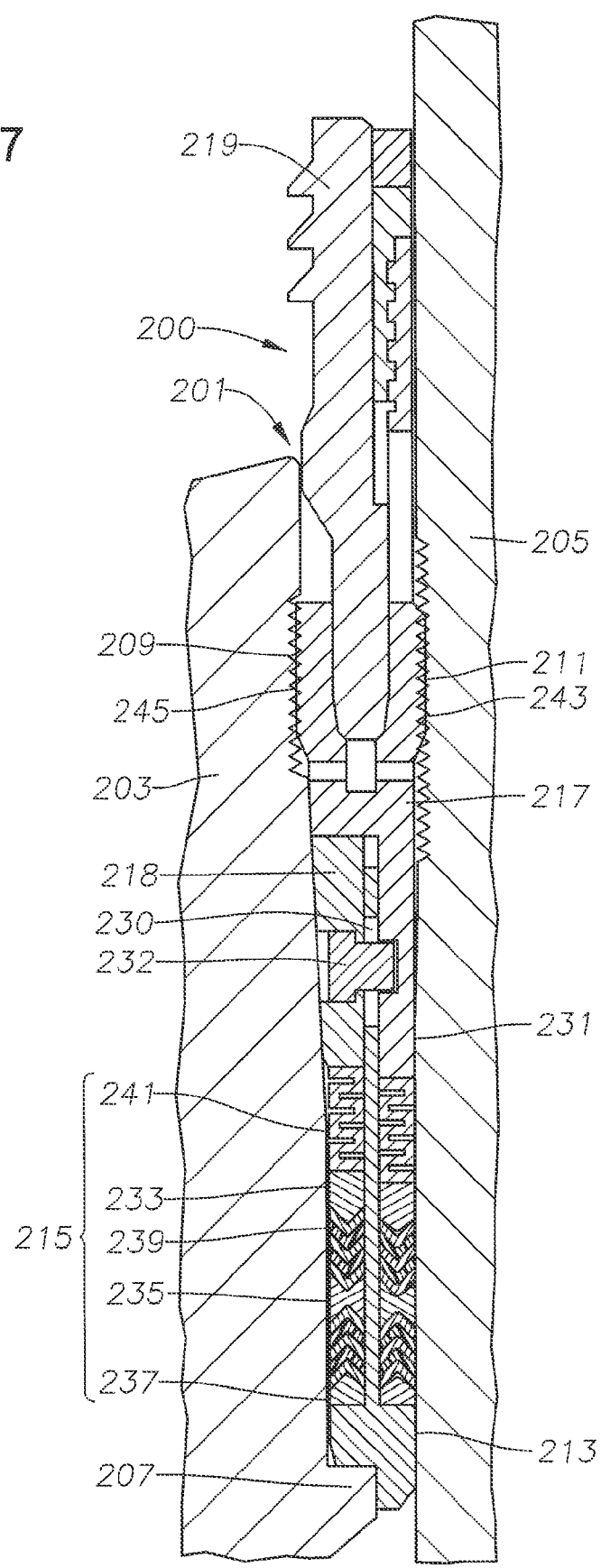
FIG. 7 is a sectional view of an energized sealing assembly of FIG. 5.

Referring now to FIG. 7, energizing ring 219 has energized casing hanger seal 200. Here, a casing hanger running tool (not shown) has forced the energizing ring 219 into the slot defined by locking ring 217. Initially, an axial force applied to energizing ring 219 compresses inner and outer sealing ring assembly 215, 216 by applying a downward axial force to locking ring 217 through energizing ring 219. The downward axial force applied to locking ring 217 also causes coupling ring 218 to move axially downward to the limit allowed by the movement of bolt 232 in bolt slot 230 of cylindrical member 214. In this manner, locking ring 217 compresses outer seal assembly 216, and coupling ring 218 compresses inner seal assembly 215. In the illustrated embodiment, the compression of inner and outer sealing ring assembly 215, 216 causes inner and outer sealing rings 239, 240 to flare radially.

Figure 8A:
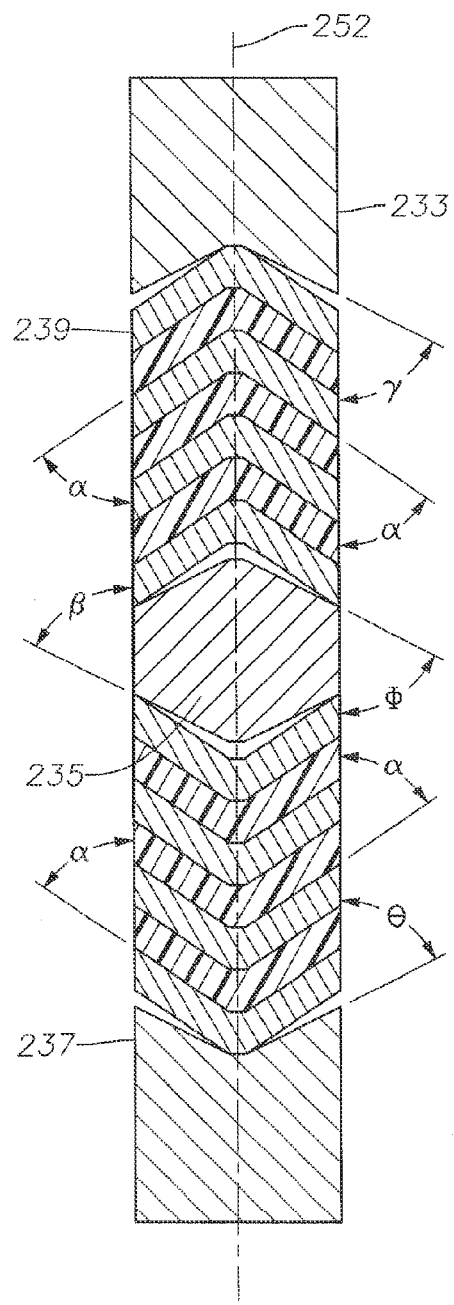
FIG. 8A is a detail view of exemplary sealing rings of FIG. 5.

As exemplified in FIG. 8A with respect to inner seal assembly 215, but applicable to inner and outer seal assemblies 215, 216, a surface of inner upper base ring 233 adjacent to inner sealing rings 239 form an angle of γ with a vertical axis 252. The surfaces of the arm of inner sealing ring 239 adjacent to inner upper base ring 233 forms an angle of α with vertical axis 252. Similarly, inner center ring 235 forms an angle of φ with vertical axis 252 that differs from inner sealing ring 239 angle α. Inner center ring 235 forms an angle of β with vertical axis 252 that differs from inner sealing ring 239 arm angle α. Finally, inner lower base ring 237 forms an angle of θ that differs from inner sealing ring 239 arm angle α. Under compression, it is the differential angles of inner upper base ring 233, inner center ring 235, and inner lower base ring 237 that causes flaring of inner sealing rings 239. The angle γ of upper base ring 233, φ and β of inner center ring 235, and θ of lower base ring 237 is determined through use of Finite Element Analysis in order to generate the desired contact with the sealed members based on the particular geometry of sealed members and the materials used in the individual sealing rings. In some instances the angle α of sealing rings 239 may be greater than β, θ, φ, and γ, and in others α may be both greater than or less than the angles of the β, θ, φ, and γ group. In alternative embodiments, this occurs due to the differing angle of each inner and outer sealing ring arm 239, 240 relative to the adjacent inner and outer sealing ring arm 239, 240 as described above with respect to FIG. 4. A person skilled in the art will understand that the angle of each inner and outer sealing ring 239, 240 may be selected so that the sealing effect of the individual inner and outer sealing ring 239, 240 increases as fluid or gas pressure within annulus 201 increases.

Figure 8B:
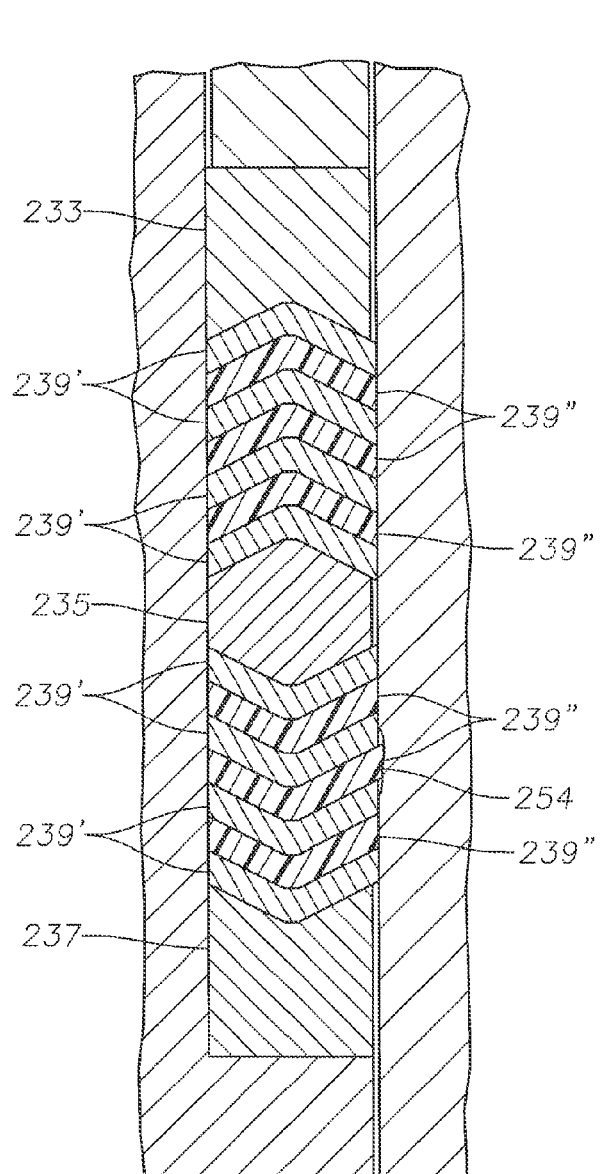
FIG. 8B is a detail view of energized exemplary sealing rings of FIG. 5.

As described above, seal assemblies 215, 216 include seal stacks comprised of sealing rings 239, 240. Each seal stack has an anti-extrusion sealing ring 239', preferably comprised of a metal, axially above and below a compliant sealing ring 239", preferably comprised of a thermoplastic material. As shown in FIG. 8B, when energized, sealing rings 239 flare radially. Flared anti-extrusion sealing rings 239' engage high pressure housing 205 and casing hanger 203, creating a trapped volume between the upper anti-extrusion sealing ring 239' and the lower anti-extrusion sealing ring 239'. The trapped volume constrains any deformation of compliant sealing ring 239". The axial pressure on sealing ring assembly 215 deforms compliant sealing ring 239", causing compliant sealing ring 239" to flow into sealing engagement with casing hanger 203. In this manner, compliant sealing rings 239" will fill any damaged areas 254 of casing hanger 203 in the area to be sealed by casing hanger seal 200. Similarly, compliant sealing rings 240' will fill any damaged areas of high pressure housing 205 in the area to be sealed by casing hanger seal 200.

In some embodiments, at least one of the anti-extrusion sealing rings 239' above and below compliant sealing ring 239" will seal to casing hanger 203. In these embodiments, each sealing ring 239 may be selected for a specific purpose. For example, a first anti-extrusion sealing ring 239' may seal to casing hanger 203, a compliant sealing ring 239" may fill damaged areas 254 of casing hanger 203, and a second anti-extrusion sealing ring 239' may not seal to casing hanger 203 while still constraining deformation of complaint sealing ring 239".

As illustrated in FIG. 7, continued application of an axial force to energizing ring 219 following compression and flaring of inner and outer sealing ring assembly 215, 216 forces energizing ring 219 into the slot defined by locking ring 217 forcing locking ring legs 243, 245 radially into wickers 209, 211 of casing hanger 203 and high pressure housing 205. Further application of axial force to energizing ring 219 causes locking ring legs 243, 245 to deform into wickers 209, 211, limiting axial movement of locking ring 217. The limitation of axial movement of locking ring 217 causes continual compression of inner and outer scaling ring assembly 215, 216, helping to maintain the flare of inner and outer sealing rings 239, 240 and an effective seal of annulus 201.

In the illustrated embodiment, inner and outer spring elements 241, 242 are preloaded such that inner and outer spring element 241, 242 exerts an axial force on inner and outer sealing ring assembly 215, 216. During operational use of casing hanger seal 200, casing hanger seal 200 will experience thermal expansion and contraction. The thermal expansion and contraction of casing hanger seal 200 will cause axial slippage of locking ring 217 lessening the axial force on inner and outer seal assemblies 215, 216. Preloaded inner and outer spring element 241, 242 will exert an axial force on inner and outer seal assemblies 215, 216 to maintain the flare of inner and outer sealing rings 239, 240 during events of axial slippage of locking ring 217. In this manner, casing hanger seal 200 maintains an effective seal of annulus 201.

In instances where casing hanger seal 200 must be removed, a running tool secures to energizing ring 219 and applies an upward axial force. This upward axial force withdraws energizing ring 219 from the slot defined by locking ring 217. In response, locking ring legs 243, 245 withdraw from their deformed positions on wickers 209, 211, thus unlocking locking ring 217. Once locking ring 217 is removed from its locked position, an axial force no longer maintains compression of inner and outer seal assemblies 215, 216 releasing the seal maintained by inner and outer sealing rings 239, 240, unsealing annulus 201. A running tool may then retrieve casing hanger seal 200 from the annulus 201 without causing damage to casing hanger 203 or high pressure housing 205.

Accordingly, the disclosed embodiments provide numerous advantages over other casing hanger seals. For example, the embodiments disclosed herein provide a casing hanger seal that seals damaged casing hangers and high pressure wellhead housings without using elastomer seal elements. In addition, the disclosed embodiments provide a seal with an expected life of twenty years that can withstand extreme temperature ranges from −20 degrees Fahrenheit to 350 degrees Fahrenheit. Furthermore, the disclosed embodiments do not require an interference fit, instead maintaining the seal within a smaller area than the sealed annulus until the casing hanger seal is energized, thus preventing additional damage to wellbore casing and the casing hanger seal. Finally, the disclosed embodiments provide a casing hanger seal that is retrievable and replaceable.

While the invention has been shown or described in only some of its forms, it should be apparent to those skilled in the art that it is not so limited, but is susceptible to various changes without departing from the scope of the invention.

What is claimed is:

1. A wellhead assembly comprising:
a wellhead housing having a bore with an axis;
a casing hanger landed in the bore, defining an annular seal pocket between the casing hanger and the wellhead housing;
a seal assembly that seals within the seal pocket, comprising:
an upper seal having inner and outer seal surfaces that seal between the casing hanger and the wellhead housing, the upper seal having a depending extension member below the inner and outer seal surfaces;
a lower seal, comprising:
a lower seal retaining ring;
a cylindrical member extending from the extension member to the lower seal retaining ring;
an outer seal stack between the lower seal retaining ring and the extension member and having an inner diameter in engagement with the cylindrical member;
the outer seal stack having compliant sealing elements that move to a set position, sealing between a surface of the wellhead housing and the cylindrical member;
an inner seal stack coaxial with the outer seal stack between the lower seal retaining ring and the extension member, the inner seal stack having an outer diameter smaller than the inner diameter of the outer seal stack and in engagement with the cylindrical member;
the inner seal stack having compliant sealing elements that move to a set position, sealing between a surface of the casing hanger and the cylindrical member; and
the outer seal stack and the inner seal stack being movable to the set position in response to an axial force applied by downward movement of the upper seal member relative to the lower seal member along a load path through the extension member, the outer and inner seal stacks and the lower seal retaining ring, the load path bypassing the cylindrical member.

2. The wellhead assembly of claim 1, wherein the outer and inner seal stacks each comprise:

a first anti-extrusion sealing ring having a chevron shaped geometry;
a second anti-extrusion sealing ring having a chevron shaped geometry, the second anti-extrusion sealing ring coaxial with and axially below the first anti-extrusion sealing ring; and
a first compliant sealing ring having a chevron shaped geometry, the first compliant sealing ring coaxial with and interposed between the first anti-extrusion sealing ring and the second anti-extrusion sealing ring.

3. The wellhead assembly of claim 2, wherein the compliant sealing ring comprises a material having a modulus of elasticity no greater than half of the modulus of elasticity of the first and second anti-extrusion rings.

4. The wellhead assembly of claim 1, wherein:
the lower seal retaining ring does not seal to the wellhead housing and to the casing hanger while the outer seal stack and the inner seal stack are in the set position.

5. The wellhead assembly of claim 2, wherein the outer and inner seal stacks each further comprise:
a third anti-extrusion sealing ring having a chevron shaped geometry, the third anti-extrusion sealing ring coaxial with the first and second anti-extrusion sealing rings;
a fourth anti-extrusion sealing ring having a chevron shaped geometry, the fourth anti-extrusion sealing ring coaxial with the first, second, and third anti-extrusion sealing rings;
a second compliant sealing ring having a chevron shaped geometry, the second compliant sealing ring coaxial with and interposed between the third anti-extrusion sealing ring and the fourth anti-extrusion sealing ring; and
wherein the first and second anti-extrusion sealing rings face in a first axial direction, and the third and fourth anti-extrusion sealing rings face in a second axial direction, opposite the first axial direction, thereby forming a bi-directional seal when energized.

6. The wellhead assembly of claim 1, further comprising:
a spring assembly between the extension member and the lower seal retaining ring and axially aligned with the outer and inner seal stacks; and
wherein the load path passes through the spring assembly, which maintains an axial force on the outer and inner seal stacks while in the set position, thereby maintaining a radial force between the outer seal stack and the wellhead housing and the inner seal stack and the casing hanger.

7. The wellhead assembly of claim 1, wherein:
the cylindrical member has an upper end and a lower end; and wherein the wellhead assembly further comprises:
a slip joint connector on one of the ends of the cylindrical member for preventing a compressive load from being applied to the cylindrical member while the upper seal is moving downward relative to the lower seal.

8. The wellhead assembly of claim 1, further comprising:
an outer spring in engagement with and axially aligned with the outer seal stack between the lower seal retaining ring and the extension member on an outer side of the cylindrical member;
an inner spring in engagement with and axially aligned with the inner seal stack between the lower seal retaining ring and the extension member on an inner side of the cylindrical member; and
each of the outer and inner springs comprising a tubular member having outer slots extending radially from an outer side of the tubular member that alternate with inner slots extending radially from an inner side of the tubular member, the inner and outer slots of each of the outer and inner springs being perpendicular to the axis.

9. The wellhead assembly of claim 1, further comprising:
a slip joint connector on an upper end of the cylindrical member that connects the cylindrical member to the extension member and allows axial downward movement of the extension member relative to the cylindrical member; and wherein
a lower end of the cylindrical member is rigidly connected to the lower seal retaining ring.

10. The wellhead assembly of claim 1, wherein:
the extension member comprises a lower leg and a coupling ring mounted to one side of the lower leg with a fastener;
the cylindrical member has an upper portion sandwiched between the lower leg and the coupling ring, the upper portion having an aperture through which the fastener extends, connecting the cylindrical member to the lower leg; and
the aperture is sized to allow downward movement of the lower leg and the coupling ring relative to the cylindrical member while the upper seal is moving downward relative to the lower seal.

11. A wellhead assembly comprising:
a wellhead housing having a bore with an axis;
a casing hanger landed in the bore, defining an annular seal pocket between the casing hanger and the wellhead housing;
a deformable metal-to-metal seal in the seal pocket having inner and outer surfaces that sealingly engage the casing hanger and the wellhead housing, respectively, when energized;
an extension member depending from the metal-to-metal seal;
a seal retainer ring having annular upward facing inner and outer shoulders, the seal retainer ring having a lower end that engages a landing shoulder between the casing hanger and the wellhead housing;
a cylindrical member having a lower end joined to the seal retainer ring and extending upward from a location between the inner and outer shoulders;
an outer seal stack carried on the outer shoulder and having an inner surface in engagement with an outer side of the cylindrical member, the outer seal stack having compliant members that seal between the outer side of the cylindrical member and the wellhead housing when energized;
an inner seal stack carried on the inner shoulder and having an outer surface in engagement with an inner side of the cylindrical member, the inner seal stack having compliant members that seal between the inner side of the cylindrical member and the casing hanger when energized; and
a slip joint connection assembly that connects the cylindrical member to the extension member, allowing downward movement of the extension member relative to the cylindrical member, such that downward movement of the metal-to-metal seal and the extension member after the seal retainer ring lands on the landing shoulder applies downward forces through the extension member to the inner and outer seal stacks to cause the inner and outer seal stacks to set.

12. The wellhead assembly of claim 11, wherein:
the extension member comprises a lower leg and a coupling ring alongside the lower leg;
the slip joint connection assembly comprises:
an axially elongated hole in the cylindrical member above the inner and outer seal stacks;
a fastener extending from the coupling ring through the elongated hole into engagement with the lower leg, the elongated hole enabling the coupling ring, the fastener, and the lower leg to move downward a limited extent relative to the cylindrical member; and wherein
the lower leg has a lower end that applies an axial force to one of the seal stacks, and the coupling ring has a lower end that applies an axial force to the other of the seal stacks while the metal-to-metal seal moves downward relative to the seal stacks.

13. The wellhead assembly of claim 11, further comprising:
an outer spring located on the outer side of the cylindrical member axially between the outer seal stack and the metal-to-metal seal; and
an inner spring located on the inner side of the cylindrical member axially between the inner seal stack and the metal-to-metal seal.

14. The wellhead assembly of claim 13, wherein:
each of the inner and outer springs comprises a tubular member having inward extending slots extending from an outer side of the spring that alternate axially with outward extending slots extending from an inner side of the spring, defining a serpentine configuration;
the inward extending and outward extending slots of the inner and outer springs are located in radial planes perpendicular to the axis; and
each of the inward extending and outward extending slots of the inner and outer springs has an axial dimension that is less than an axial dimension from one of the inward extending slots to an adjacent one of the outward extending slots.

15. The wellhead assembly of claim 11, wherein:
the outer seal stack comprises chevron shaped elastomeric rings alternating with chevron shaped metallic rings, the elastomeric rings and the metallic rings each having an inner edge sealingly contacting the cylindrical member and an outer edge sealingly contacting the wellhead housing; and
the inner seal stack comprises chevron shaped elastomeric rings alternating with chevron shaped metallic rings, the elastomeric rings and the metallic rings of the inner seal stack each having an outer edge sealingly contacting the cylindrical member and an inner edge sealingly contacting the casing hanger.

16. A wellhead assembly comprising:
a wellhead housing having a bore with an axis;
a casing hanger landed in the bore, defining an annular seal pocket between the casing hanger and the wellhead housing;
a metal-to-metal seal within the seal pocket and having an inner leg and an outer leg separated by an annular slot;
an energizing ring that when moved downward within the slot, pushes the inner leg into engagement with the casing hanger and the outer leg into engagement with the wellhead housing;
an extension member depending from the metal-to-metal seal;
a cylindrical member carried by the extension member and extending downward therefrom;
a seal retainer ring at a lower end of the cylindrical member;
an inner seal stack supported by the seal retainer ring and located between and in sealing engagement with the casing hanger and the cylindrical member, the inner seal stack comprising chevron shaped rings;

an outer seal stack supported by the seal retainer ring and located between and in sealing engagement with the wellhead housing and the cylindrical member, the outer seal stack comprising chevron shaped rings;

an inner spring on an inner side of the cylindrical member below the extension member and above the inner seal stack;

an outer spring on an outer side of the cylindrical member below the extension member and above the outer seal stack; and the cylindrical member, inner seal stack and outer seal stack being configured such that downward movement of the energizing ring and the metal-to-metal seal relative to the seal retainer ring applies downward forces through the extension member to the inner and outer springs and to the inner and outer seal stacks to cause the inner and outer seal stacks to set, the downward forces bypassing the cylindrical member; and wherein continued downward movement of the energizing ring after the inner and outer seal stacks have set causes the energizing ring to move downward in the slot to set the inner and outer legs.

17. The wellhead assembly of claim 16, wherein:

the extension member comprises a lower leg and a coupling ring alongside the lower leg;

the lower leg has a lower end in abutment with one of the springs;

the coupling ring has a lower end that abuts the other of the springs; the wellhead assembly further comprises:

an axially elongated hole in the cylindrical member above the inner and outer springs; and a fastener extending radially from the coupling ring through the elongated hole into engagement with the lower leg, the elongated hole enabling the coupling ring, the fastener, and the lower leg to move downward a limited extent relative to the cylindrical member.

18. The wellhead assembly of claim 17, wherein:

the lower leg has a greater length than the coupling ring.

19. The wellhead assembly of claim 16, wherein:

the inner seal stack comprises an upper set and a lower set of V-shaped rings, the rings of the upper set being inverted relative to the rings of the lower set; and the outer seal stack comprises an upper set and lower set of V-shaped rings, the rings of the upper set of the outer seal stack being inverted relative to the rings of the lower set of the outer seal stack.

20. The wellhead assembly of claim 16, wherein:

the inner spring comprises an inner tubular member extending around the axis, the inner tubular member having inward extending slots extending from an outer side of the inner spring that alternate axially with outward extending slots extending from an inner side of the inner spring, defining a serpentine configuration;

the outer spring comprises an outer tubular member extending around the cylindrical member, the outer tubular member having inward extending slots extending from an outer side of the outer tubular member that alternate axially with outward extending slots extending from an inner side of the outer tubular member, defining a serpentine configuration; and the inward and outward extending slots of the inner spring and of the outer spring are located in radial planes perpendicular to the axis.

* * * * *